United States Patent
Lo et al.

(10) Patent No.: US 8,444,861 B2
(45) Date of Patent: May 21, 2013

(54) METHOD AND APPARATUS USING HYDROGEN PEROXIDE AND MICROWAVE SYSTEM FOR SLURRIES TREATMENT

(75) Inventors: Kwang Victor Lo, Burnaby (CA); Ping Liao, Richmond (CA); Wayne Wong, Richmond (CA); Weigang Miles Yi, Vancouver (CA); Weng I Chan, Burnaby (CA); Frederic A. Koch, Vancouver (CA); Donald S. Mavinic, North Vancouver (CA)

(73) Assignee: The University of British Columbia

( * ) Notice: Subject to any disclaimer, the term of this patent is extended or adjusted under 35 U.S.C. 154(b) by 944 days.

(21) Appl. No.: 12/376,934

(22) PCT Filed: Aug. 11, 2006

(86) PCT No.: PCT/CA2006/001327
§ 371 (c)(1),
(2), (4) Date: Mar. 19, 2009

(87) PCT Pub. No.: WO2008/017137
PCT Pub. Date: Feb. 14, 2008

(65) Prior Publication Data
US 2010/0044306 A1    Feb. 25, 2010

(51) Int. Cl.
C02F 9/14       (2006.01)
C02F 9/12       (2006.01)

(52) U.S. Cl.
USPC . 210/748.07; 210/631; 210/200; 210/748.01; 210/151; 210/205; 422/21; 422/24; 422/186

(58) Field of Classification Search
USPC .............. 210/748.01–748.1, 631, 200, 151, 210/205, 199, 702, 721, 759, 774, 806, 632; 422/20, 22, 24, 186.01
See application file for complete search history.

(56) References Cited

U.S. PATENT DOCUMENTS 3,523,076 A      8/1970   Goerz
4,978,508 A  *  12/1990   Hansen et al. ........... 422/186.08
(Continued)

FOREIGN PATENT DOCUMENTS

| CA | 2435033 | 1/2005 |
|---|---|---|
| CN | 1690302 | 11/2005 |
| KR | 3072284 | 9/2003 |

OTHER PUBLICATIONS

Ahn, K.-H., Park, K.Y., Maeng, S.K., Hwang, J.H., Lee, J.W., Song, K. G. and Choi, S. (2002). Ozonation of wastewater and ozonation for recycling. Wat. Sci. Tech., 46(10), 71-77.

(Continued)

Primary Examiner — Joseph Drodge
Assistant Examiner — Cameron J Allen
(74) Attorney, Agent, or Firm — Oyen Wiggs Green & Mutala LLP

(57) ABSTRACT

A method and apparatus for treating slurries of organic solids is disclosed. A slurry of organic solids is admixed with hydrogen peroxide, followed by exposure to microwave irradiation resulting in the heating of the mixture and enhanced hydrolysis of the organic solids. The treated slurry of organic solids can then be further treated in a variety of downstream processes, including solid separation, digestion and fermentation. The supernatant portion of the treated slurry of organic solids can be a source from which to recover compounds such as nutrients (for example nitrogen, phosphate, potassium, magnesium, calcium) or industrial organic compounds (such as acetic acid, propionic acid, butyric acid), or as a source of readily biodegradable organic compounds for supplementing a biological wastewater treatment process, digester or fermenter.

29 Claims, 2 Drawing Sheets

U.S. PATENT DOCUMENTS

| | | | | |
|---|---|---|---|---|
| 5,256,299 | A | * | 10/1993 | Wang et al. .................. 210/664 |
| 5,354,458 | A | * | 10/1994 | Wang et al. .................. 210/194 |
| 5,580,521 | A | * | 12/1996 | Gagne ............................ 422/28 |
| 5,666,640 | A | | 9/1997 | Daniylchev |
| 5,730,845 | A | * | 3/1998 | Harper et al. ............ 204/157.64 |
| 5,785,845 | A | * | 7/1998 | Colaiano .................... 210/167.3 |
| 6,039,921 | A | * | 3/2000 | Boucher ........................ 422/21 |
| 6,090,296 | A | * | 7/2000 | Oster ....................... 210/748.12 |
| 6,183,351 | B1 | * | 2/2001 | Aoki .............................. 451/60 |
| 6,406,510 | B1 | * | 6/2002 | Burnham .......................... 71/11 |
| 7,431,834 | B2 | | 10/2008 | Shimamura |
| 2004/0159335 | A1 | * | 8/2004 | Montierth et al. .............. 134/10 |
| 2006/0138046 | A1 | | 6/2006 | Stafford |

OTHER PUBLICATIONS

Chiu, Y.C., Chang, C.N., Lim, J.G. and Huang, S.J. (1997). Alkaline and ultrasonic pre-treatment of sludge before anaerobic digestion. Wat. Sci. Tech., 36(11), 155-162.

Hiraoka, M., Takeda, N., Sakai, S. and Yasuda, A. (1984). Highly efficient anaerobic digestion with thermal pre-treatment. Wat. Sci. Tech., 17(4/5), 529-539.

Kepp, U., Machenbach, I., Weisz, N. and Solheim, O.E. (2000). Enhanced stabilisation of sewage sludge through thermal hydrolysis—three years experience with full scale plant. Wat. Sci. Tech., 42(9), 89-96.

Recktenwald, M. and Karlsson, I. (2003). Recovery of wastewater sludge components by acid hydrolysis. Presented at IWA Specialised Conf. BIOSOLIDS 2003 Wastewater Sludge as a Resource, Trondheim, Norway, Jun. 23-25, 2003.

Svanström, M., Modell, M. and Tester, J. (2004). Direct energy recovery from primary and secondary sludges by supercritical water oxidation. Wat. Sci. Tech., 49(10), 201-208.

Tiehm, A., Nickel, K., Zellhorn, M. and Neis, U. (2001). Ultrasonic waste activated sludge disintegration for improving anaerobic stabilization. Water Research, 35, 2003-2009.

Weisz, N., Kepp, U., Norli, M., Panter, K. and Solheim, O.E. (2000). Sludge disintegration with thermal hydrolysis—cases from Norway, Denmark and United Kingdom. 1st IWA World Congress, Paris Jul. 3-7. Pre-prints Book 4, pp. 288-295.

Yasui, H. and Shibata, M. (1994). An innovative approach to reduce excess sludge production in the activated sludge process. Wat. Sci. Tech., 30(9), 11-20.

Liao et al.: 'Advanced oxidation process using hydrogen peroxide/microwave system for solubilization of phosphate' Journal of Environmental Science and Healt—Part A Toxic/Hazardous Substances and Environmental Engineering vol. 40, No. 9, 2005, pp. 1753-1761.

Klan et al.: 'Non-catalytic remediation of aqueous solutions by microwave-assisted photolysis in the presence of H2O2' Journal of Photochemistry and Photobiology A: Chemistry vol. 177, No. 1, Jan. 2006, pp. 24-33.

Liao et al.: 'Release of phosphorus from sewage sludge using microwave technology' Journal of Environmental Engineering and Science vol. 4, No. 1, Jan. 2005, pp. 77-81.

Wong et al.: 'Exploring the role of hydrogen peroxide in the microwave advanced oxidation process: solubilization of ammonia and phosphates' Journal of Environmental Engineering and Sciences vol. 5, No. 6, Nov. 2006, pp. 459-465.

Wong et al.: 'A hydrogen peroxide/microwave advanced oxidation process to sewage sludge treatment' Journal of Environmental Science and Health—Part A Toxic/Hazardous Substances of Environmental Engineering vol. 41, No. 11, Nov. 2006, pp. 2623-2633.

Chan et al.: 'Sewage sludge nutrient solubilization using a single-stage microwave treatment' Journal of Environmental Science and Health- Part A Toxic/Hazardous Substances and Environmental Engineering vol. 42, No. 1, Jan. 2007, pp. 59-63.

Liao et al.: 'Sludge reduction and volatile fatty acid recovery using microwave advanced oxidation process' Journal of Environmental Science and Health—Part A Toxic/Hazardous Substances and Environmental Engineering vol. 42, No. 5, Apr. 2007, pp. 633-639.

International Search Report dated May 14, 2007 relating to Patent Cooperation Treaty Application No. PCT/CA2006/001327 (Publ. No. WO 2008/017137).

* cited by examiner

METHOD AND APPARATUS USING HYDROGEN PEROXIDE AND MICROWAVE SYSTEM FOR SLURRIES TREATMENT

TECHNICAL FIELD

The present invention relates in general to the treatment of organic waste material, such as sludge resulting from sewage treatment facilities, animal waste, or industrial organic waste. More specifically, the invention relates to a process and apparatus for treating organic waste materials by the combination of microwave irradiation and oxidants such as hydrogen peroxide or ozone as a form of advanced oxidation process (AOP). The invention functions to solubilize organic solids through hydrolysis, resulting in soluble compounds available for recovery or further processing, as well as providing microbicidal activity, breaking down organic molecules, and reducing the mass of residual solid matter.

BACKGROUND

The disposal of organic waste materials such as sewage sludge, animal manure, food processing waste, and the like, presents both environment and public health concerns.

The production of large volumes of sludge as an end-product from wastewater treatment processes poses one of the biggest challenges to the wastewater treatment industry. The handling and disposal of sludge residuals has significant social, environmental, and economic implications. Treatment and disposal of sewage sludge from wastewater treatment plants can account for over half of the total cost of wastewater treatment plant construction and operation. Currently, residual sludge is commonly digested, incinerated, deposited in landfills, or used as fertilizer through agricultural land application of the residual biosolids.

In current wastewater treatment processes, toxic heavy metals become concentrated in the residual sludge. There may also be dangerous levels pathogenic organisms present in the residuals. For these reasons there are increasing concerns that land application of sludge residuals may be harmful to the environment and to public health. Under such social, environmental and economic pressures, significant effort has been invested in developing new methods of treating wastewater and wastewater sludges that result in smaller amounts of residual requiring disposal.

Anaerobic digestion is a very common solids reduction and stabilization technology, but is relatively inefficient due to the low biodegradability of the sludge. This poor biodegradability is particularly evident in the case of digesting secondary or waste activated sludge. The benefit of anaerobic digestion is that the methanogenesis stage of the process results in the production of methane (biogas) which can be used as an energy source. To improve the efficiency of the anaerobic digestion process, many techniques which enhance the biodegradability of these sludges have been developed in recent years.

The anaerobic degradation of particulate organics is considered to be a sequence of three steps: hydrolysis, acidogenesis, and methanogenesis. Among these, biological hydrolysis of the particulate organics has been considered to be the rate limiting step.

Many of the techniques recently developed to improve the biodegradability of sludges therefore focus on improving hydrolysis by other means. The processes most focused on are chemical oxidation disintegration by ozone, mechanical disintegration by various methods, and thermal or thermal/chemical disintegration. These techniques include those discussed in the following references:

Ahn, K.-H., Park, K. Y., Maeng, S. K., Hwang, J. H., Lee, J. W., Song, K. G. and Choi, S. (2002). Ozonation of wastewater and ozonation for recycling. Wat. Sci. Tech., 46(10), 71-77.

Chiu, Y. C., Chang, C. N., Lim, J. G. and Huang, S. J. (1997). Alkaline and ultrasonic pre-treatment of sludge before anaerobic digestion. Wat. Sci. Tech., 36(11), 155-162.

Hiraoka, M., Takeda, N., Sakai, S. and Yasuda, A. (1984). Highly efficient anaerobic digestion with thermal pre-treatment. Wat. Sci. Tech., 17(4/5), 529-539.

Kepp, U., Machenbach, I., Weisz, N. and Solheim, O. E. (2000). Enhanced stabilisation of sewage sludge through thermal hydrolysis—three years experience with full scale plant. Wat. Sci. Tech., 42(9), 89-96.

Recktenwald, M. and Karlsson, I. (2003). Recovery of wastewater sludge components by acid hydrolysis. Presented at IWA Specialised Conf. BIOSOLIDS 2003 Wastewater Sludge as a Resource, Trondheim, Norway, 23-25 Jun. 2003.

Svanström, M., Modell, M. and Tester, J. (2004). Direct energy recovery from primary and secondary sludges by supercritical water oxidation. Wat. Sci. Tech., 49(10), 201-208.

Tiehm, A., Nickel, K., Zellhorn, M. and Neis, U. (2001). Ultrasonic waste activated sludge disintegration for improving anaerobic stabilization. Water Research, 35, 2003-2009.

Weisz, N., Kepp, U., Norli, M., Panter, K. and Solheim, O. E. (2000). Sludge disintegration with thermal hydrolysis—cases from Norway, Denmark and United Kingdom. 1st IWA World Congress, Paris 3-7 July. Pre-prints Book 4, pp 288-295.

Yasui, H. and Shibata, M. (1994). An innovative approach to reduce excess sludge production in the activated sludge process. Wat. Sci. Tech., 30(9), 11-20.

Most of these prior processes operate either with large amount of chemical dosage or under high temperature and pressure conditions or both. Energy consumptions are typically large for many of these processes.

There remains a need for a cost-effective process to achieve solid waste disintegration, nutrient solubilization and pathogen destruction.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments of the present invention and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements to the existing art.

The present invention relates to a process and apparatus for treating slurries of organic solids. A slurry of organic solids is admixed with hydrogen peroxide, followed by exposure to microwave irradiation resulting in the heating of the mixture and enhanced hydrolysis of the organic solids. The treated slurry of organic solids can then be further treated in a variety of downstream processes, including solid separation, digestion and fermentation. The supernatant portion of the treated slurry of organic solids can subsequently be used beneficially as a source from which to recover valuable compounds such as nutrients (for example nitrogen, phosphate, potassium, magnesium, calcium) or industrial organic compounds (such as acetic acid, propionic acid, butyric acid), or as a source of readily biodegradable organic compounds for supplementing a biological wastewater treatment process, digester or fermenter. The treatment process also results in the conversion of a significant portion of volatile solids to soluble organic compounds, thus leaving reduced amounts of sludge solids for further treatment and disposal and increasing the rate at which the waste can be stabilized in downstream treatment processes.

The process can also be used, for example, as a side stream process, treating a portion of return activated sludge in an activated sludge treatment process. This would result in a significant reduction in overall process sludge yield, and produce a supernatant stream suitable for nutrient removal or recovery through a variety of known processes (chemical precipitation, ion exchange or struvite recovery for example). This would also provide a source of readily biodegradable organic compounds, comprised primarily of volatile fatty acids (such as acetic acid, propionic acid and butyric acid) which can be used to improve biological nutrient removal processes such as denitrification and enhanced biological phosphorus removal. Reintroduction of the treated effluent from the AOP at strategic points in a wastewater treatment could lead to significant improvements in denitrification rates as well as biological phosphorus removal rates.

The term "slurry of organic solids" is used herein to refer generally to waste materials such as sewage sludge, animal manure, food processing waste and the like. The term "supernatant" is used herein to refer generally to a liquid wastewater solution separated from such a slurry, by means such as gravity sedimentation, floatation, filtration, centrifugation or the like.

Slurries to be treated using the current invention can have a suspended solids content in the range of 0.05% to 30%, while most typical slurries that are anticipated to be of commercial interest will typically have suspended solids content in the range of 0.1 to 15%. Below this range of solids content the energy and chemical requirements are likely to become uneconomical, and above these solids ranges, the slurries become difficult to convey using fluid pumping equipment and efficient mixing of the oxidant in the slurry becomes difficult due to the elevated viscosity of the slurry.

Peroxide dosage rates found to be effective in treating the slurries is a minimum of 0.03% $H_2O_2$ by volume in the admixed slurry, or 0.3 g of $H_2O_2$ per litre of admixed slurry. Below this dosage rate the enhancement of thermal hydrolysis by microwave irradiation alone is not significantly improved. 30% hydrogen peroxide solution has been found to be a suitable source of hydrogen peroxide for the process.

It has been shown that Ozone can be used in place of hydrogen peroxide as a source of oxidant for the current process, however in embodiments tested to date, hydrogen peroxide has been shown to be more effective.

For the treatment of secondary sewage sludge slurries, it has been found that pH adjustment is of some but little benefit to the process in terms of its ability to solubilize chemical oxygen demand, and reduce suspended solids levels. In this case operation in the pH range of 6 to 7 has been found to be optimal.

For the treatment of certain slurries, such as dairy manure, it has been found that acidification of the slurry to a pH as low as 2, using a strong acid, such as sulfuric acid, either before or after treatment with the current invention significantly improves the solubilization of the slurry through acid hydrolysis.

Microwave irradiation at a frequency of 2450 MHz has been used to raise the temperature of the admixed slurry at a rate of 5-50° C. per minute to the target temperature, and thereafter maintain the temperature for a period of 0-15 minutes, and preferably 5 minutes.

Treatment temperatures in the microwave chamber of at least 50° C. are required to achieve effective solubilization of the slurry. Treatment temperatures up to 200° C. have been evaluated, and generally increased temperature results in increased solubilization for a given oxidant dose. It has also been found that the solubilization reaction is generally complete within a treatment time of 5 minutes in a batch reactor. Exposure to microwave radiation for longer periods of time was not found to improve the degree of solubilization of the slurries tested to date. Certain other types of slurries could however benefit from longer durations of treatment if they contain organic material that is more resistant to oxidation and thermal hydrolysis.

In slurries tested to date, the current invention has been capable of converting up to 100% of the insoluble Chemical Oxygen Demand ("COD"), and phosphorus, to soluble COD, and ortho-phosphate respectively. At the same time significant portions of total nitrogen are converted to ammonia, and a large fraction of nutrients present in solid form are converted to soluble form. The process also results in the destruction of up to 100% of volatile suspended solids.

The apparatus for carrying out the process could be either a batch process or a continuous flow process.

The batch process apparatus consists of a reaction vessel in which organic solid slurry is first introduced and mixed with hydrogen peroxide solution (either mixed in a common conduit before entering the reaction vessel, or introduced into the vessel through separate conduits and mixed within the vessel. The admixed slurry is then irradiated with microwave energy as required to obtain the desired temperature profile. The contents of the vessel are then discharged using either a pump or the pressure built up within the vessel. The contents can be passed through a heat exchanger to preheat the untreated slurry. Treated slurry can then be further treated by solid/liquid separation before being passed on to further treatment or recovery processes.

The continuous flow process consists of admixing the organic solid slurry with hydrogen peroxide in a mixing vessel or conduit, and then exposing the admixture to microwave irradiation in a flow through vessel or conduit enclosed within a microwave irradiation chamber. The treated slurry is continuously pumped into the mixing vessel through to the irradiation chamber and out. Once again, the treated waste can be passed through a heat exchanger countercurrently with the fresh slurry of organic solids to preheat the slurry before it is introduced to the mixing vessel. Treated slurry can then be further treated by solid/liquid separation before being passed on to further treatment or recovery processes.

Many processes could be used to further treat the treated slurry after treatment with the current invention. Because a large portion of the COD in the slurry has been converted to soluble form by the process, the remaining solids portion of the slurry contains a significantly reduced non-inert fraction. Further treatment of the solids fraction will therefore result in relatively minor further breakdown of any remaining non-inerts. It will therefore be beneficial in many cases to separate the treated slurry into a solids containing fraction and a liquid fraction through solid-liquid separation using a variety of known methods.

The liquid fraction thus formed can then be treated in a variety of available high rate anaerobic processes (such as fixed film bioreactors, upflow anaerobic sludge blanket reactors, hybrid suspended/attached growth bioreactor) to generate biogas for recovery.

The elevated soluble nutrient content of the liquid fraction also presents an opportunity for nutrient recovery, through crystallization of struvite, struvite analogs, calcium phosphate, or the like. Several reactor designs for this purpose exist.

The liquid fraction also contains elevated concentrations of volatile fatty acids, (primarily acetic, propionic and butyric acids) which can either be used directly in solution, or could be recovered through distillation, solvent extraction or other liquid/liquid separation processes.

In certain cases it may not be practical to separate the solid and liquid fractions of the treated slurry, but further treatment may still be desirable. In this case the soluble nature of the majority of the organic compounds will allow such digestion or fermentation processes to be designed with significantly reduced retention times. In some cases, the reduced solids content of the treated slurry may allow further treatment to occur in a fixed film bioreactor, upflow anaerobic sludge blanket reactor, or hybrid suspended/attached growth bioreactor rather than a traditional fermenter or digester design.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Hereinafter, preferred embodiments of the present invention are described with reference to the accompanying drawings. However, the present invention is not limited thereto.

An apparatus according to the present invention and a process of treating a slurry of organic solids with the apparatus is described.

Figure 1:
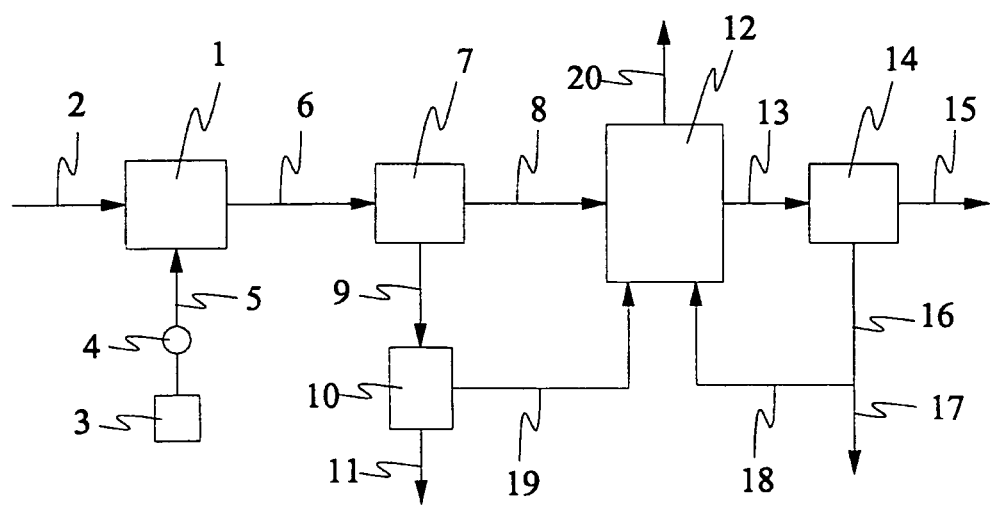
FIG. 1 is a scematic diagram showing an apparatus embodying the present invention and a generalized process flow of treating a slurry of organic solids according to the present invention.

FIG. 1 is a schematic diagram of an apparatus embodying the present invention and shows a generalized process flow for treating a slurry comprising organic solids suspended in water with the apparatus.

As shown in FIG. 1, the microwave/hydrogen peroxide reactor system 1 and solid-liquid separation tank 7 are arranged between further treatment vessel 12 and slurry feed conduit 2.

Hydrogen peroxide solution storage tank 3 is connected to microwave/hydrogen peroxide reactor system 1 via hydrogen peroxide solution supply conduit 5 and conduit 5 is equipped with pump 4 for supplying hydrogen peroxide solution.

Microwave/hydrogen peroxide reactor system 1 is connected to solid-liquid separation tank 7 via conduit 6.

Optional solid-liquid separation tank 7 is connected to further treatment vessel 12 via conduit 8 for feeding treated slurry of organic solids. Solid-liquid separation tank 7 is also connected to optional product recovery system 10 via conduit 9 for recovery of nutrients, minerals or organic compounds.

Product recovery system 10 is connected to further treatment vessel 12 via conduit 19 for feeding the liquid fraction of the treated slurry after recovery of nutrients, minerals or organic compounds. Conduit 11 for recovered products (nutrients, minerals or organic compounds) or for direct use of a portion of the liquid stream in conduit 9 is also connected to product recovery system 10.

Further treatment vessel 12 is connected to solid-liquid separation system 14 via conduit 13 for drawing further treated slurry. Further treatment vessel 12 has vent 20 for recovery of biogas in the case of anaerobic process.

Conduit 16 for dewatered solids and conduit 15 for liquid effluent are connected to solid-liquid separation system 14. Conduit 16 can optionally branch into two conduits; one, i.e. conduit 17, is for disposing of residual solids, and the other, i.e. conduit 18 is for returning solids to further treatment vessel 12.

Hereinafter, workings of the apparatus according to the present embodiment are described.

Slurry comprising organic solids suspended in water is introduced into microwave/hydrogen peroxide reactor system 1 via conduit 2 and is admixed with hydrogen peroxide and subsequently exposed to microwave irradiation. Pump 4 works to supply hydrogen peroxide solution from the solution storage tank 3 to microwave/hydrogen peroxide reactor system 1 via conduit 5. The admixed slurry may preferably be treated for 5 minutes for maintaining temperature within the range of 50 to 200 degree Celsius. The combinations of hydrogen peroxide dosage amount and heating temperature vary depending on the target treatment results. With temperature lower than 50 degree Celsius, organic solids are not sufficiently disintegrated for enhancing solids solubilization to a satisfactory degree. Higher temperature or larger amount of hydrogen peroxide dosage has been shown to be unnecessary and uneconomical.

The slurry of organic solids treated by the microwave/hydrogen peroxide reactor system is then optionally sent to solid-liquid separation system 7 via conduit 6 and separated into solids containing component and a liquid component. The solid containing component can then optionally be sent to further treatment vessel 12 via conduit 8 and anaerobically digested by microorganisms. The supernatant rich in nutrients (phosphorus and nitrogen) is introduced into the crystallization reactor 10 via conduit 9 for recovery. After recovery, the nutrient pellets (struvite or other phosphate compounds) are separated and harvested from supernatant via conduit 11. The remaining supernatant rich in soluble COD is introduced into anaerobic digestion tank 12 via conduit 19.

The digested slurry of organic solids in anaerobic digestion tank 12 is discharged from conduit 13 and separated into solid component and liquid component in solid-liquid separation tank 14. The liquid component is discharged from conduit 15 for wastewater and solid component is discharged from conduit 16 for thickened solid waste. The solid component in conduit 16 is discharged via conduit 17 for disposal. If deemed necessary, part of the solid component is returned to anaerobic digestion tank 12 through conduit 18 for further digestion. Meanwhile, the digester biogas in anaerobic digestion tank 12 is recovered from vent 20.

With the above described treatment combination of hydrogen peroxide and microwave irradiation, organic solids are disintegrated to a high degree (up to 100 percent). Hydrogen peroxide is one of the most powerful oxidizers. Through microwave irradiation, hydrogen peroxide can be converted into highly reactive hydroxyl radicals that possess a higher oxidation potential than the hydrogen peroxide itself. Hardly soluble substances in the slurry of organic solids, such as fibers and cell walls, can be converted to readily biodegradable COD in the soluble form. This disintegration of organic solids can greatly enhance the biological hydrolysis rate in anaerobic digestion process. As a result, the anaerobic digestion time could be shortened, digested biogas yield could have a significant increase, and solid waste to be finally disposed could be reduced.

In addition, nutrients (phosphorus and nitrogen) in the slurry of organic solids is efficiently released by the above described treatment combination of hydrogen peroxide and microwave irradiation. Phosphorus and nitrogen are converted and solubilized in the forms of ortho-phosphate and ammonia for direct recovery through crystallization reactor. The nutrient pellet recovered in the forms of struvite, struvite analogs or other phosphate compounds is a valuable end-product.

According to the present invention, it is possible to treat a slurry of organic solids in a cost-effective manner and to recover the energy and resource, i.e. digested biogas, soluble organic compounds and nutrient pellets.

In the present embodiment, AOP treated slurry of organic solids is introduced to an anaerobic digestion tank. However, AOP treated slurry of organic solids may be introduced to a fermentation reactor. The fermentation product, such as acetate, can be used as a substrate material for many industrial applications.

It should be said that it will likely be familiar to someone skilled in the art that:
- further treatment vessel can be either a digestor, fermentor, fixed film bioreactor, upflow anaerobic sludge blanket reactor, or hybrid suspended/attached growth bioreactor or other similar known treatment processes
- resource recovery can be solvent extraction, distillation, or direct use in the case of organic compounds and crystallization precipitation or ion exchange in the case of mineral compounds
- other oxidants such as Ozone could be substituted for peroxide, although perhaps with lesser effectiveness
- various process configurations can be integrated with the $H_2O_2$/microwave system (upstream and downstream process configurations can vary significantly depending on local conditions and the nature of the slurry being treated.)

Example One

Secondary aerobic sludge was obtained from the pilot-plant wastewater treatment facilities located at the University of British Columbia (UBC) campus. A set of twelve experiments were performed in order to investigate the effects of various hydrogen peroxide concentrations in the MW/$H_2O_2$-AOP. Experiments were carried out at temperatures of 60, 80, 100 and 120° C. Various concentrations of hydrogen peroxide were tested with the objective of improving the degree of COD, nutrient and metal solubilization from sewage sludge. Either 1 mL or 2 mL of hydrogen peroxide (30 wt %) was added to sludge to make up a total volume of 30 mL for each microwave sample.

A closed-vessel microwave digestion system (Ethos TC Digestion Labstation 5000, Milestone Inc., U.S.A.) with a maximum output of 1000 W was used in this study. The system operates at 2450 MHz and consists of dual independent magnetrons with a rotating microwave diffuser for homogeneous microwave distribution. The microwave digestion system, using an independent system controller, provides real-time temperature control. The heating time was kept constant at 5 minutes for all experiments at the pre-determined heating temperatures. The ramp times were varied with respect to temperature in order to maintain a uniform rate of heating (increase of ca. 20° C. per minute of heating) up to the desired experimental temperatures.

Figure 2:
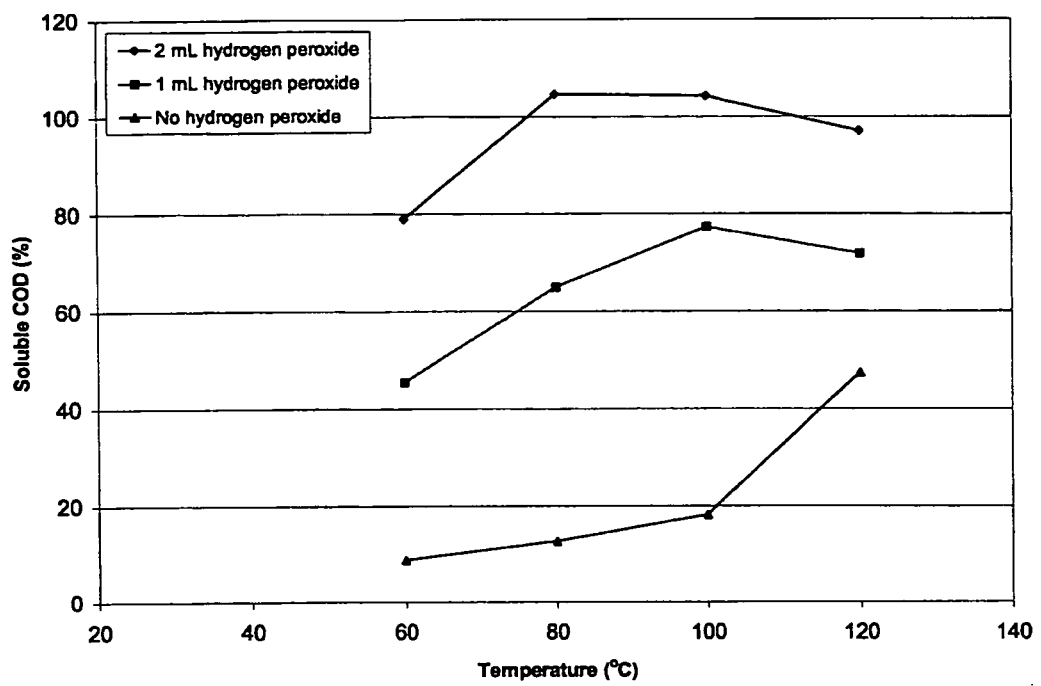
FIG. 2 is a graph showing the effect of temperature and hydrogen peroxide dosage on percent soluble COD in a process of treating waste activated sludge from a municipal wastewater treatment plant according to the present invention.

FIG. 2 shows the percentage of soluble COD after treatments for the 3 tested hydrogen peroxide concentrations (0, 1 and 2 mL) at four temperature settings (60, 80, 100 and 120° C.). The results showed that for each temperature, there was a significant increase in soluble COD with increased hydrogen peroxide concentrations. At 60° C. and 2 mL of $H_2O_2$ (i.e., 3 wt. % in sample of 30 mL), approximately 80% of the total COD was found to be in solution; this is almost 8 times of the amount of soluble COD from the control, where no hydrogen peroxide was added. At temperatures of 80° C. and above, and at 2 mL of $H_2O_2$, approximately all 100% of the COD was in soluble form.

As shown in FIG. 2, with the addition of $H_2O_2$, the accelerated release of COD into soluble form occurred at lower temperatures. For the 1 mL $H_2O_2$ addition runs, the maximum soluble COD was achieved at 100° C. The increased $H_2O_2$ addition allowed the maximum COD release to occur at lower microwave heating temperatures.

TABLE 1 and TABLE 2 list the soluble concentrations of nutrients, metals and COD after AOP treatment. Ammonia concentrations ranged from 1.2-108 mg N/L, while ortho-phosphate concentrations ranged from 27.5-75.6 mg P/L. The measured concentrations of soluble ammonia, ortho-phosphate, and magnesium were used to determine the Mg:NH3:PO4 molar ratio. From our results, ammonia was determined to be the limiting nutrient without any hydrogen peroxide addition in the microwave process. In all cases, magnesium was non-limiting, indicating for this treatment process that theoretically, no magnesium addition is required for struvite crystallization. Magnesium, calcium and potassium concentrations ranged from 18.3-40.0 mg/L, 9.9-31.2 mg/L, and 63.7-83.1 mg/L respectively.

TABLE 1

| Temperature (° C.) | H2O2 (mL) | Ortho-$PO_4$ (mg P/L) | Ortho-$PO_4$ (% of TP) | $NH_3$ (mg N/L) | $NH_3$ (% of TN) |
| --- | --- | --- | --- | --- | --- |
| 60 | 0 | 75.6 | 48.1 | 3.5 | 1.2 |
|  | 1 | 59.0 | 40.4 | 29.3 | 9.6 |
|  | 2 | 54.1 | 37.1 | 66.0 | 21.6 |
| 80 | 0 | 39.3 | 25.0 | 2.1 | 0.7 |
|  | 1 | 27.5 | 18.8 | 29.5 | 9.7 |
|  | 2 | 37.8 | 23.4 | 85.7 | 28.1 |
| 100 | 0 | 37.2 | 23.0 | 1.5 | 0.5 |
|  | 1 | 38.9 | 24.4 | 29.8 | 9.8 |
|  | 2 | 39.7 | 24.9 | 96.2 | 31.5 |
| 120 | 0 | 55.6 | 34.5 | 1.2 | 0.4 |
|  | 1 | 60.3 | 37.4 | 52.6 | 17.3 |
|  | 2 | 63.3 | 39.3 | 108 | 35.5 |

TABLE 2

| Temperature (° C.) | H2O2 (mL) | Metals (mg/L) | | | Soluble COD | |
|---|---|---|---|---|---|---|
| | | Mg | Ca | K | (mg/L) | (%) |
| 60 | 0 | 23.2 | 14.8 | 66.3 | 390 | 9 |
| | 1 | 19.5 | 14.3 | 73.5 | 2027 | 45 |
| | 2 | 18.3 | 13.4 | 68.4 | 3532 | 79 |
| 80 | 0 | 19.0 | 10.3 | 72.7 | 566 | 13 |
| | 1 | 13.1 | 6.8 | 59.6 | 2897 | 65 |
| | 2 | 21.7 | 13.8 | 63.7 | 4668 | 105 |
| 100 | 0 | 29.8 | 16.2 | 75.4 | 812 | 18 |
| | 1 | 29.0 | 20.6 | 69.0 | 3452 | 77 |
| | 2 | 22.6 | 9.9 | 70.0 | 4650 | 104 |
| 120 | 0 | 29.4 | 23.1 | 83.1 | 2115 | 47 |
| | 1 | 40.0 | 31.2 | 78.6 | 3207 | 72 |
| | 2 | 34.8 | 29.4 | 72.0 | 4333 | 97 |

As described above, the process of the present invention, in which microwave irradiation and hydrogen peroxide is combined, is highly effective not only in solubilization of carbon for acetate or methane production, but also in solubilization of nutrients for crystallization of fertilizer products, such as struvite.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for treating a slurry comprising organic solids suspended in water, the method comprising:
    admixing hydrogen peroxide with the slurry to yield an admixed slurry having a first suspended solids content;
    subjecting at least half of the admixed slurry to microwave radiation during a treatment period to yield a treated slurry having a second suspended solids content less than the first suspended solids content;
    drawing off a supernatant part from the treated slurry and recovering a dissolved mineral by crystallizing the dissolved mineral.

2. A method according to claim 1 comprising increasing a treatment temperature of the admixed slurry during at least a portion of the treatment period to at least 50° C. during the treatment period while subjecting the admixed slurry to microwave radiation.

3. A method according to claim 2 comprising heating the admixed slurry from a first temperature to a final treatment temperature at a rate of at least 5° C. per minute.

4. A method according to claim 2 wherein heating the admixed slurry to the treatment temperature comprises irradiating the admixed slurry with microwave radiation.

5. A method according to claim 2, claim 3 or claim 4 wherein the treatment period is at most 5 minutes.

6. A method according to claim 1 comprising maintaining the admixed slurry at a pH in excess of 2 while subjecting the admixed slurry to microwave radiation.

7. A method according to claim 6 comprising maintaining the admixed slurry at a pH in the range of 2 to 10 while subjecting the admixed slurry to microwave radiation.

8. A method according to claim 7 comprising maintaining the admixed slurry at a pH in the range of 6 to 7 while subjecting the admixed slurry to microwave radiation.

9. A method according to claim 6 in which the pH of the admixed slurry is adjusted using an acid.

10. A method according to claim 2 comprising maintaining the admixed slurry at a treatment pressure that is equal to or greater than atmospheric pressure during the treatment period.

11. A method according to claim 10 wherein the treatment temperature is in excess of 100° C.

12. A method according to claim 2 wherein the treatment temperature does not exceed 100° C.

13. A method according to claim 1 wherein the second suspended solids content is at least 30% less than the first suspended solids content.

14. A method according to claim 1 wherein the first suspended solids content is in the range of 0.05% to 30%.

15. A method according to claim 14 wherein the first suspended solids content is in the range of 0.1% to 15%.

16. A method according to claim 1 wherein admixing hydrogen peroxide with the slurry comprises introducing at least 0.03% by volume of hydrogen peroxide into the slurry.

17. A method according to claim 1 wherein admixing hydrogen peroxide with the slurry comprises introducing at least 0.3 g of hydrogen peroxide into each liter of the slurry.

18. A method according to claim 16 or 17 wherein the hydrogen peroxide that is introduced into the slurry comprises a 30% hydrogen peroxide solution.

19. A method according to claim 1 wherein the admixed slurry has a first soluble chemical oxygen demand and the treated slurry has a second soluble chemical oxygen demand in excess of the first soluble chemical oxygen demand.

20. A method according to claim 19 wherein the second soluble chemical oxygen demand exceeds the first soluble chemical oxygen demand by at least 30%.

21. A method according to claim 1 wherein the treated slurry has a soluble chemical oxygen demand in excess of 30% of total chemical oxygen demand.

22. A method according to claim 1 comprising subjecting the treated slurry to a further treatment process selected from the group of processes comprising anaerobic digestion, fermentation, acidification, treatment in a fixed film bioreactor, treatment in an upflow anaerobic sludge blanket reactor, treatment in a hybrid suspended/attached growth bioreactor, and a treatment in an acid hydrolysis reactor.

23. A method according to claim 1 wherein the dissolved mineral comprises phosphate.

24. A method according to claim 1 wherein the dissolved mineral is recovered as struvite or a struvite analog.

25. A method according to claim 23 or claim 29 wherein crystallizing the dissolved mineral comprises adding ammonium or magnesium to the supernatant part to create a supersaturation of the dissolved mineral.

26. A method according to claim 1 comprising subjecting a suspended solids-containing part of the treated slurry remaining after drawing off the supernatant part from the treated slurry to a further treatment process selected from the group of processes comprising anaerobic digestion, fermentation, acidification, treatment in a fixed film bioreactor, treatment in an upflow anaerobic sludge blanket reactor, treatment in a hybrid suspended/attached growth bioreactor, and a treatment in an acid hydrolysis reactor.

27. A method according to claim 1 wherein the slurry comprises sewage sludge.

28. A method for treating a slurry comprising organic solids suspended in water, the method comprising:
    admixing ozone with the slurry to yield an admixed slurry having a first suspended solids content;
    subjecting at least half of the admixed slurry to microwave radiation during a treatment period to yield a treated slurry having a second suspended solids content less than the first suspended solids content;

drawing off a supernatant part from the treated slurry and recovering a dissolved mineral from the supernatant part by crystallizing the dissolved mineral.

29. A method for treating a slurry comprising organic solids suspended in water, the method comprising:
   admixing ozone and hydrogen peroxide with the slurry to yield an admixed slurry having a first suspended solids content;
   subjecting at least half of the admixed slurry to microwave radiation during a treatment period to yield a treated slurry having a second suspended solids content less than the first suspended solids content;
   drawing off a supernatant part from the treated slurry and recovering a dissolved mineral from the supernatant part by crystallizing the dissolved mineral.

* * * * *